United States Patent Office 2,853,509
Patented Sept. 23, 1958

2,853,509
PRODUCTION OF DIKETO-NITRILES

Leslie H. Sutherland, Wellesley, and Elizabeth A. McElhill, Cambridge, Mass., assignors to Escambia Chemical Corporation, Pace, Fla., a corporation of Delaware No Drawing. Application July 29, 1957
Serial No. 674,630

20 Claims. (Cl. 260—465)

This invention relates to the production of chemicals and more particularly to the preparation of novel symmetrical diketo nitriles.

A principal object of the present invention is to prepare symmetrical diketo nitriles from sodamide, a nitrile and a diester of a saturated aliphatic dicarboxylic acid containing at least one methylene group.

Another object of the invention is to prepare symmetrical diketo nitriles which are novel and particularly useful.

Other objects of the invention will in part be obvious and will in part appear hereinafter.

The invention accordingly comprises the process involving the several steps and the relation and the order of one or more of such steps with respect to each of the others which are exemplified in the following detailed disclosure and the scope of the application of which will be indicated in the claims.

For a fuller understanding of the nature and objects of the invention, reference should be had to the following detailed disclosure.

The process of the present invention comprises reacting in liquid ammonia the sodium derivative of a nitrile of the general formula $$RCH_2CN$$

where R is either a hydrogen, phenyl or alkyl group with a diester of the general formula $$R'-O-\underset{\underset{O}{\|}}{C}-(CH_2)_n-\underset{\underset{O}{\|}}{C}-O-R'$$

where R' is an alkyl group and $n$ is a whole number of from one to eight, and recovering a symmetrical diketo nitrile of the general formula $$NC-\underset{R}{\overset{}{C}H}-\underset{\underset{O}{\|}}{C}-(CH_2)_{n_1}-\underset{\underset{O}{\|}}{C}-\underset{R}{\overset{}{C}H}-CN$$

where R is a hydrogen, phenyl or alkyl group and $n_1$ is numerically equal to $n$.

The symmetrical diketo nitriles of the present invention are of particular interest in the plastics industry. These nitriles are very easily reduced to the corresponding novel dinitriles and diamines. These dinitriles can be hydrolyzed to dibasic acids which may be esterified with polyhydric alcohols to form polyesters or reacted with diamines to form polyamides. Thus they find use in a wide variety of applications such as synthetic fibers, plastic articles and the like.

The invention will be described in connection with the reactions involving sodamide, acetonitrile and dimethyl adipate to produce 3,8-diketosebaconitrile, it being understood that the invention is by no means limited by this specific illustration.

One detailed method of practicing the present invention is set forth in the following non-limiting example.

Example I

Sodamide was prepared by adding 11.5 grams (0.5 mole) of sodium to about 600 cc. of liquid ammonia containing about 0.5 gram of an iron catalyst $$(Fe(NO_3)_3 \cdot 9H_2O)$$

21.5 grams (0.5 mole) of acetonitrile dissolved in an equal volume of diethyl ether was added from a dropping funnel to the stirred sodamide in liquid ammonia over a period of about 3 minutes. Dimethyl adipate (29 grams, 0.17 mole) in an equal volume of diethyl ether was then added over a period of 4 minutes. The stirring of the resultant mixture was continued for about one hour longer and then the ammonia was removed. As the ammonia was being evaporated, diethyl ether was added to maintain the volume of liquid in the reactor at about 400 to 500 cc. Upon completion of the ammonia removal, the resultant mixture was poured onto ice and made acidic by the addition of 6 N hydrochloric acid. The resulting solid, which is insoluble in the ether and water was then filtered off and recovered. This solid was analyzed and identified as 3,8 diketosebaconitrile. A yield of 44.7% was obtained. The diketo nitrile is insoluble in chloroform, methylene chloride, benzene and cyclohexane and soluble in acetone, acetonitrile and hot methanol. The diketo nitrile has a melting point of 146–146.2° C. after recrystallization from a methanol-acetone solution. Elemental analysis of the recrystallized sample was 62.6% carbon, 6.2% hydrogen and 14.1% nitrogen (theoretical 62.4% carbon, 6.24% hydrogen, 14.6% nitrogen).

The above reactions proceeded in the following manner:

$$NaNH_2 + CH_3CN \longrightarrow NaCH_2CN + NH_3$$

$$2NaCH_2CN + CH_3-O-\underset{\underset{O}{\|}}{C}-(CH_2)_4-\underset{\underset{O}{\|}}{C}-O-CH_3 \longrightarrow$$

$$NC-CH_2-\underset{\underset{O}{\|}}{C}-(CH_2)_4-\underset{\underset{O}{\|}}{C}-CH_2-CN$$

Although only acetonitrile has been exemplified, other nitriles having a reactive alpha methylene group can also be employed. Nitriles suitable to the reaction are phenyl acetonitrile, and aliphatic nitriles, such as propionitrile, butyronitrile, valeronitrile, capronitrile and the like. Likewise instead of dimethyl adipate other esters can be used. For example, the alkyl esters of the saturated aliphatic dicarboxylic acids, malonic, succinic, glutaric, pimelic, suberic, azelaic, or sebacic can be employed. The diesters of oxalic acid have been found to be unsuitable for the present reaction. The process is adaptable to dicarboxylic acids containing at least one methylene group between the carboxy groups and particularly to dicarboxylic acids containing from one to eight methylene groups. The alkyl esters of the above acids such as the methyl, ethyl, propyl, the butyls and amyls etc., derived from the corresponding aliphatic alcohols are the preferred forms.

The symmetrical diketo nitriles are preferably prepared by reacting the sodium derivative of one of the above mentioned nitriles with a preferred diester in liquid ammonia. The sodium derivative of the nitrile is preferably prepared by reacting a nitrile such as acetonitrile with sodamide in liquid ammonia. The sodamide can be prepared in situ in the liquid ammonia or it can be added as such, thereto. The sodio derivatives have been found to be soluble in the liquid ammonia.

The reaction between the sodium derivative of the nitrile and a preferred diester is also preferably carried out in liquid ammonia thus greatly simplifying the overall process. The diester can be added to the sodium salt bearing liquid ammonia solution or vice versa. It is, however, best to maintain an excess of the sodium derivative over the diester and therefore the addition of diester to the liquid ammonia solution is preferred.

The temperature at which the reactions take place is preferably at liquid ammonia temperature, minus 33° C. or lower. Temperatures as low as minus 50° C. have been found to be suitable. Liquid ammonia is the ideal reaction medium since (a) the sodio derivatives of the preferred nitriles are soluble therein, (b) the low temperatures necessary tend to avoid polymer formation by the nitriles and thus better yields are obtainable, (c) both reactions can take place therein, (d) it permits shorter reaction times and (e) it is easily separated from the product.

The symmetrical diketo nitriles are easily recovered by simply evaporating the ammonia therefrom. Rapid removal of the ammonia as well as the addition of an ether during the evaporation is advantageous since they avoid or reduce the tendency for making of high boiling by-products.

The process of the present invention can be simply illustrated by the following general equations.

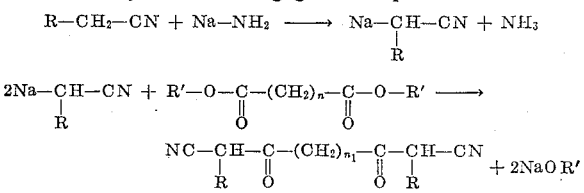

where R is selected from the group consisting of hydrogen, phenyl and alkyl groups; R' is an alkyl group; and $n$ and $n_1$ are whole numbers of from one to eight and are numerically equal.

As can be seen, the reactions produce symmetrical diketo nitriles. When acetonitrile is employed, R in the above equation is hydrogen and one hydrogen of the alpha methylene group is replaced by sodium. When a higher nitrile, such as propionitrile, is used, then R in the above equation represents an alkyl group e. g. methyl. Since the alpha methylene group is the most reactive, the sodium replaces one hydrogen thereof and the alkyl group e. g. methyl is retained as such in the desired products.

Since certain changes can be made in the above process without departing from the scope of the invention herein involved, it is intended that all matter contained in the above description shall be interpreted as illustrative and not in a limiting sense.

What is claimed is:

1. The process of producing symmetrical diketo nitriles which comprises reacting in liquid ammonia the sodium derivative of a nitrile of the general formula

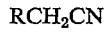

where R is selected from the group consisting of hydrogen, phenyl and lower alkyl groups with a diester of the general formula

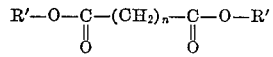

where R' is a lower alkyl group and $n$ is a whole number of from one to eight and recovering a symmetrical diketo nitrile of the general formula

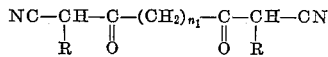

where $n_1$ is a whole number numerically equal to $n$.

2. The process of claim 1 wherein the nitrile is acetonitrile.
3. The process of claim 1 wherein the nitrile is phenylacetonitrile.
4. The process of claim 1 wherein the nitrile is propionitrile.
5. The process of claim 1 wherein the nitrile is butyronitrile.
6. The process of claim 1 wherein the nitrile is valeronitrile.
7. The process of claim 1 wherein the nitrile is capronitrile.
8. The process of claim 1 wherein the diester is that of malonic acid.
9. The process of claim 1 wherein the diester is that of succinic acid.
10. The process of claim 1 wherein the diester is that of glutaric acid.
11. The process of claim 1 wherein the diester is that of adipic acid.
12. The process of claim 1 wherein the diester is that of pimelic acid.
13. The process of claim 1 wherein the diester is that of suberic acid.
14. The process of claim 1 wherein the diester is that of azelaic acid.
15. The process of claim 1 wherein the diester is that of sebacic acid.
16. The process of producing 3,8-diketosebaconitrile which comprises reacting in liquid ammonia the sodium derivative of acetonitrile with dimethyl adipate, and recovering 3,8-diketosebaconitrile.
17. The chemical compounds of the general formula

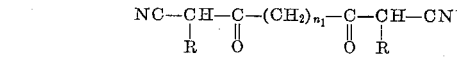

where R is selected from the group consisting of hydrogen, phenyl and lower alkyl groups and $n_1$ is a whole number of from one to eight.
18. The chemical compound, 3,8-diketosebaconitrile.
19. The process of producing symmetrical diketo nitriles which comprises reacting in liquid ammonia sodamide and a nitrile of the general formula

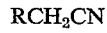

where R is selected from the group consisting of hydrogen, phenyl and lower alkyl groups, thereafter reacting the resultant sodium derivative of the nitrile with a diester of the general formula

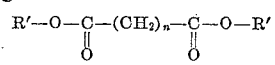

where R' is a lower alkyl group and $n$ is a whole number of from one to eight, and recovering a symmetrical diketo nitrile of the general formula

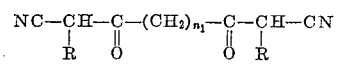

where $n_1$ is a whole number numerically equal to $n$.
20. The process of producing 3,8-diketosebaconitrile which comprises reacting sodamide and acetonitrile in liquid ammonia, thereafter reacting the resulting sodium derivative of acetonitrile with dimethyl adipate, and recovering 3,8-diketosebaconitrile.

No references cited.